(12) United States Patent
Kawato

(10) Patent No.: US 8,571,749 B2
(45) Date of Patent: Oct. 29, 2013

(54) GRILLE CONTROL MECHANISM FOR VEHICLE

(75) Inventor: Takashi Kawato, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 335 days.

(21) Appl. No.: 12/942,694

(22) Filed: Nov. 9, 2010

(65) Prior Publication Data

US 2011/0118931 A1 May 19, 2011

(30) Foreign Application Priority Data

Nov. 19, 2009 (JP) ................................ 2009-264028

(51) Int. Cl.
*G06F 11/30* (2006.01)

(52) U.S. Cl.
USPC ....... 701/29.2; 701/29.1; 701/29.6; 701/30.1; 701/30.4; 701/49; 123/41.04; 123/41.05; 123/41.06; 180/68.1; 180/68.6

(58) Field of Classification Search
None
See application file for complete search history.

(56) References Cited

U.S. PATENT DOCUMENTS

| 4,410,032 | A * | 10/1983 | Mori ............................... 165/44 |
| 4,475,485 | A * | 10/1984 | Sakakibara et al. ....... 123/41.05 |
| 4,779,577 | A * | 10/1988 | Ritter et al. ................ 123/41.05 |
| 7,766,111 | B2 * | 8/2010 | Guilfoyle et al. ............ 180/68.1 |
| 7,784,576 | B2 * | 8/2010 | Guilfoyle et al. ............ 180/68.1 |
| 2006/0095178 | A1 * | 5/2006 | Guilfoyle et al. ................ 701/36 |
| 2006/0102399 | A1 * | 5/2006 | Guilfoyle et al. ............ 180/68.1 |
| 2008/0133090 | A1 * | 6/2008 | Browne et al. .................. 701/49 |
| 2008/0210185 | A1 * | 9/2008 | Kubo et al. .................... 123/1 A |
| 2009/0050385 | A1 * | 2/2009 | Guilfoyle et al. ............ 180/68.1 |
| 2009/0179777 | A1 * | 7/2009 | Ishikawa ....................... 340/939 |
| 2011/0118945 | A1 * | 5/2011 | Mochizukii ..................... 701/49 |
| 2011/0288717 | A1 * | 11/2011 | Yu et al. ........................... 701/29 |
| 2012/0097465 | A1 * | 4/2012 | Leffert et al. ................ 180/68.1 |

FOREIGN PATENT DOCUMENTS

| EP | 0 084 378 A1 | 7/1983 |
| EP | 0 254 815 A2 | 2/1988 |
| JP | 5-50861 | 3/1993 |
| JP | 2007-320527 | 12/2007 |
| JP | 2008-6855 | 1/2008 |

OTHER PUBLICATIONS

U.S. Appl. No. 12/942,566, filed Nov. 9, 2010, Mochizuki.
Extended European Search Report issued on Mar. 1, 2011 in the corresponding European Application No. 10190858.0.

* cited by examiner

*Primary Examiner* — Khoi Tran
*Assistant Examiner* — Jonathan L Sample
(74) *Attorney, Agent, or Firm* — Oblon, Spivak, McClelland, Maier & Neustadt, L.L.P.

(57) ABSTRACT

A grille control mechanism for a vehicle includes a movable member being switchable between opened and closed positions, an electric motor actuating the movable member, and a control device controlling a supply of electric current until detecting a lock current value to execute an opening operation or a closing operation, wherein the control device executes a checking operation for returning the movable member to an initial position and executing once again the opening or closing operation in a case where a detecting time of the lock current value since the opening or closing operation is started exceeds a predetermined time, and the control device determines that the movable member is in an abnormal state in a case where a detecting time of the lock current value after the operation is started from the initial position in the checking operation exceeds the predetermined time for a predetermined number of times.

9 Claims, 5 Drawing Sheets

GRILLE CONTROL MECHANISM FOR VEHICLE

CROSS REFERENCE TO RELATED APPLICATIONS

This application is based on and claims priority under 35 U.S.C. §119 to Japanese Patent Application 2009-264028, filed on Nov. 19, 2009, the entire content of which is incorporated herein by reference.

TECHNICAL FIELD

This disclosure generally relates to a grille control mechanism for a vehicle for controlling an opening and closing operation of a movable member, which is configured so as to be switchable between an opening position for allowing ambient air to flow into a radiator provided at the vehicle and a closing position for inhibiting or restricting the ambient air from flowing into the radiator.

BACKGROUND

Disclosed in JP2008-6855A is an example of a known grille control mechanism for a vehicle. According to the grille control mechanism for the vehicle disclosed in JP2008-6855A, a movable member is provided between a front grille and a radiator of the vehicle, so that an aerodynamic characteristic of the vehicle, an engine temperature and the like is adjusted by adjusting inflow of air from a front portion of the vehicle to the radiator, in order to achieve a preferable driving performance of the vehicle. More specifically, the movable member is configured as a movable fin, which is pivotable about a horizontal axis. Accordingly, the inflow of the air is adjusted by controlling an air inlet passage to be opened and closed by the movable fin so that air resistance, lift force or downforce is applied to the vehicle in order to ensure a stable driving performance of the vehicle.

Disclosed in JPH5-50861A is another example of a known grille control mechanism for a vehicle. According to the grille control mechanism for the vehicle disclosed in JPH5-50861A, a movable member (a movable grille) is controlled to be opened and closed in response to an environmental condition (e.g. ambient temperature and the like) and an engine load condition (e.g. a temperature of an engine cooling medium and the like). The grille control mechanism for the vehicle disclosed in JPH5-50861A estimates an opening-closing state of the movable member, by which an appropriate cooling effect is supposed to be obtained under a certain environmental condition and the engine load condition, on the basis of plural determination conditions, which are stored within a storing means. Then, the grille control mechanism executes an opening-closing control of the movable member on the basis of the estimation result in order to adjust cooling of the engine cooling medium to be appropriate.

Both of the grille control mechanism disclosed in JP2008-6855A and the grille control mechanism disclosed in JPH5-50861A are intended to improve the cooling of the engine cooling medium, to achieve a driving stability of the vehicle and the like by controlling the movable member to be at the opened position or the closed position on the basis of each condition. Therefore, in a case where a mechanical error or malfunction occurs at a driving mechanism of the movable member because of, for example, an object being caught in the movable member, the operation in response to the control may not properly be executed.

In a case where an operation control of the movable member is maintained (continues) without recognizing the error or the malfunction of the movable member when the above-mentioned situation occurs, an excessive load may be applied to the movable member, an electric motor and the like, so that a damage may occur thereat. However, providing a potentiometer and the like to the grille control mechanism in order to check whether or not the movable member is controlled to be at a position as commanded may lead to an increase in manufacturing costs of the grille control mechanism for the vehicle, inflexibility in mountability of the grille control mechanism for the vehicle, and the like. Furthermore, in a case where an object which is easily removable, such as a pebble and the like, is caught in the movable member and the grille control mechanism determines the error or the malfunction occurs, a user may need to take an appropriate action, such as removing the pebble, every time when the grille control mechanism determines that the error or the malfunction occurs when the easily removable object is caught in the movable member.

A need thus exists to provide a grille control mechanism for a vehicle which is not susceptible to the drawback mentioned above.

SUMMARY

According to an aspect of this disclosure, a grille control mechanism for a vehicle includes a movable member, whose position is switchable between an opened position for allowing an ambient air to flow into a radiator provided at the vehicle and a closed position for inhibiting or restricting the ambient air from flowing into the radiator, an electric motor actuating the movable member, and a control device controlling an electric current to be supplied to the electric motor until detecting a lock current value in order to selectively execute one of an opening operation for moving the movable member to the opened position and a closing operation for moving the movable member to the closed position, wherein the control device executes a checking operation for returning the movable member to an initial position where the movable member is located when the one of the selectively executed opening and closing operations is started and executing once again one of the selectively executed opening operation and the closing operation in a case where a time for detecting the lock current value since one of the selectively executed opening operation and the closing operation is started exceeds a predetermined time, and the control device determines an operation state of the movable member is an abnormal state in a case where a time for detecting the lock current value after the one of the selectively executed opening and closing operation is started after the movable member is returned to the initial position in the checking operation exceeds the predetermined time for a predetermined number of times.

According to another aspect of this disclosure, a

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a grille control mechanism for a vehicle will be described below with reference to the attached drawings of FIGS. 1 to 5.

Figure 1:
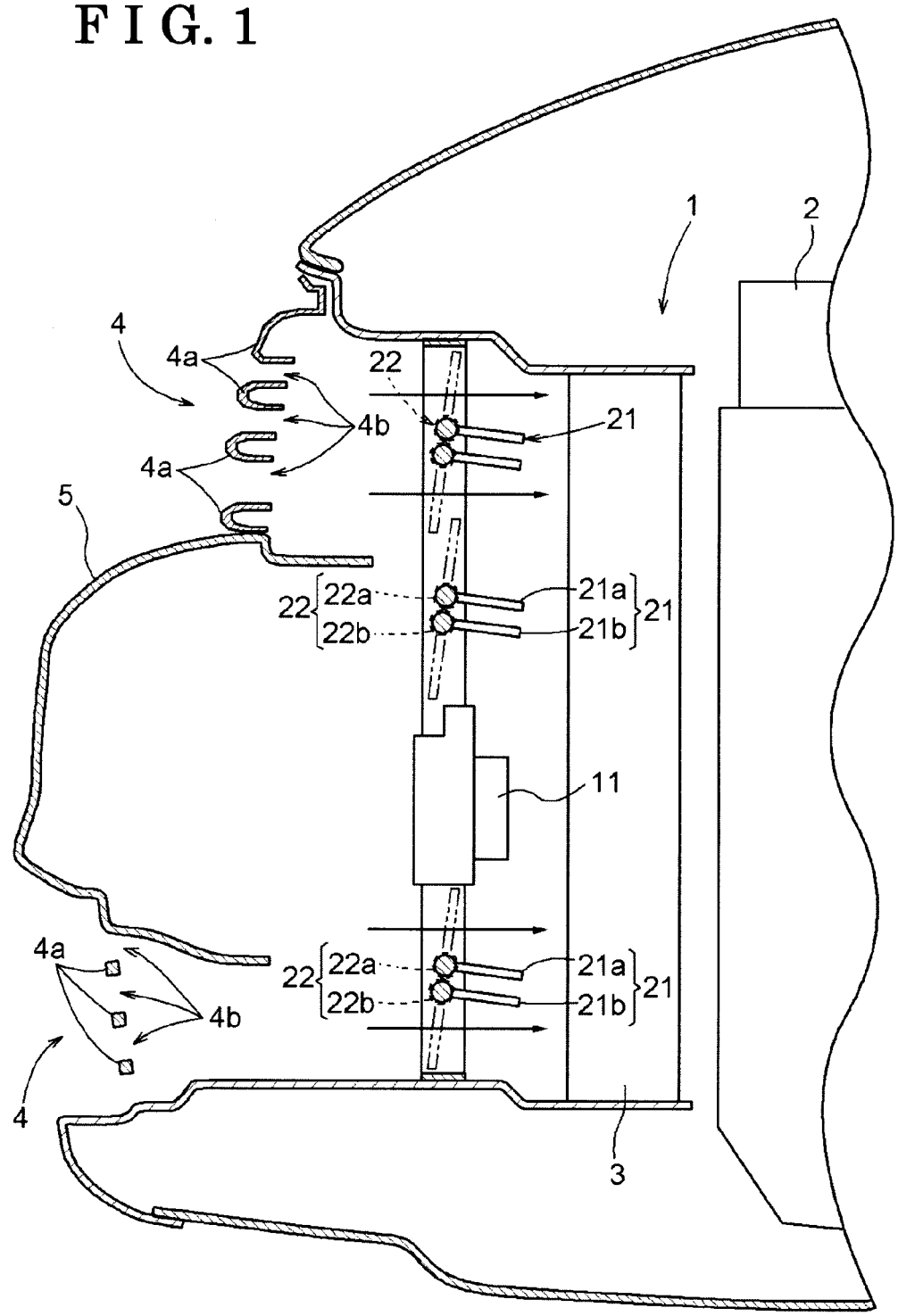
FIG. 1 is a cross-sectional diagram illustrating a front portion of a vehicle in a case where a movable member is at an opened position.
Figure 2:
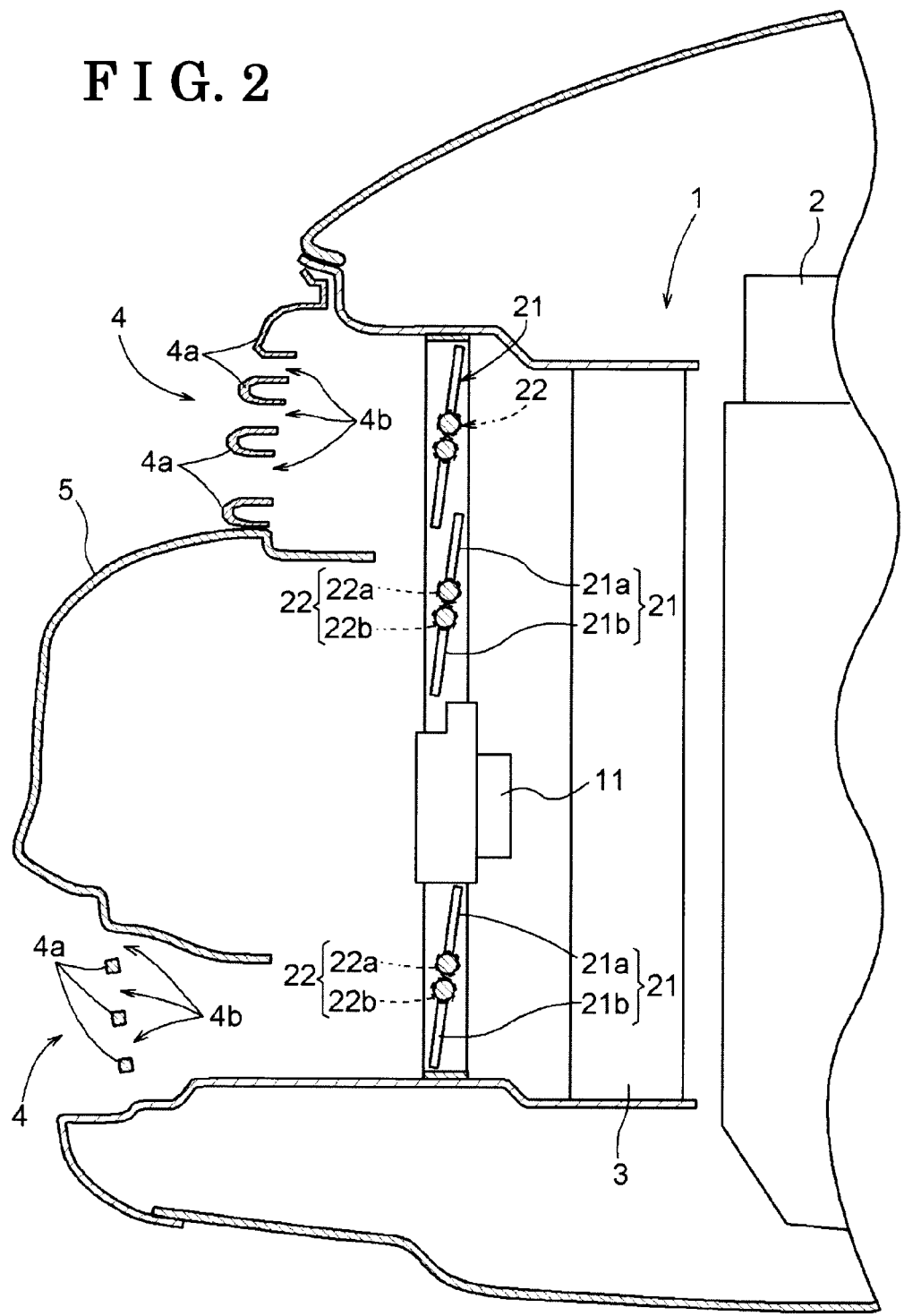
FIG. 2 is a cross-sectional diagram illustrating the front portion of the vehicle in a case where the movable member is at a closed position.

Illustrated in FIG. 1 is a cross-sectional diagram of a front portion of the vehicle in a case where a movable member 21 is at an opened position. In this embodiment, plural movable members 21 are provided at the vehicle. On the other hand, illustrated in FIG. 2 is a cross-sectional diagram of the front portion of the vehicle in a case where the movable members 21 are at a closed position. As illustrated in FIGS. 1 and 2, an engine 2 and a radiator 3 for cooling a cooling medium of the engine 2 are mounted in an engine room 1. The movable members 21 are provided in front of the radiator 3 in a front-rear direction of the vehicle. The movable members 21 are controlled to be opened and closed by a control means 11 (a control device), so that air inlet from a front grille 4 is controlled to be allowed and inhibited to flow into the engine room 1. The front grilles 4 are provided above and below a bumper 5. More specifically, each front grille 4 includes frame portions 4a mainly forming a design of the front grille 4 and opening portions 4b for allowing the air (ambient air) to flow towards the engine room 1.

Each of the movable members 21 includes a main movable member 21a and a driven member 21b. Furthermore, each of the movable members 21 is configured so that the main movable member 21a and the driven member 21b, which are arranged adjacent to each other, are actuated together as a unit. A rotating shaft 22 (in this embodiment, plural rotating shafts 22 are provided) includes a first rotating shaft 22a and a second rotating shaft 22b. The first rotating shafts 22a, which are connected to end portions of the main movable members 21a, respectively, and which extend in a vehicle width direction, and the second rotating shafts 22b, which are connected to end portions of the driven member 21b, respectively, and which extend in the vehicle width direction, are operated together as a unit via a gear. Accordingly, a force (a rotational force) generated by an electric motor 12 (see FIG. 3), which is actuated in response to a command outputted from the control means 11, is directly transmitted to the main movable members 21a via the corresponding first rotating shafts 22a. The force, which is generated by the electric motor 12 and is transmitted through a transmission system, is also transmitted to the second rotating shafts 22b via the gear, so that the driven members 21b are simultaneously rotated together with the corresponding main movable members 21a.

As illustrated in FIG. 1, in the case where the movable members 21 are at the opened position, the air introduced from the front grilles 4 is allowed to flow into the engine room 1 and facilitates the cooling of the cooling medium, which flows inside of the radiator 3. On the other hand, in the case where the movable members 21 are at the closed position, as illustrated in FIG. 2, the air introduced from the front grilles 4 does not inflow into the engine room 1. Therefore, in this case, air resistance, a lift force and the like acting on the vehicle becomes smaller. Furthermore, in this case, the air blocked by the movable members 21 from entering into the engine room 1 flows under a floor of the vehicle and generates a downforce on the vehicle. Therefore, in the case where the movable members 21 are controlled to be at the closed position, a driving stability of the vehicle may be enhanced.

Figure 3:
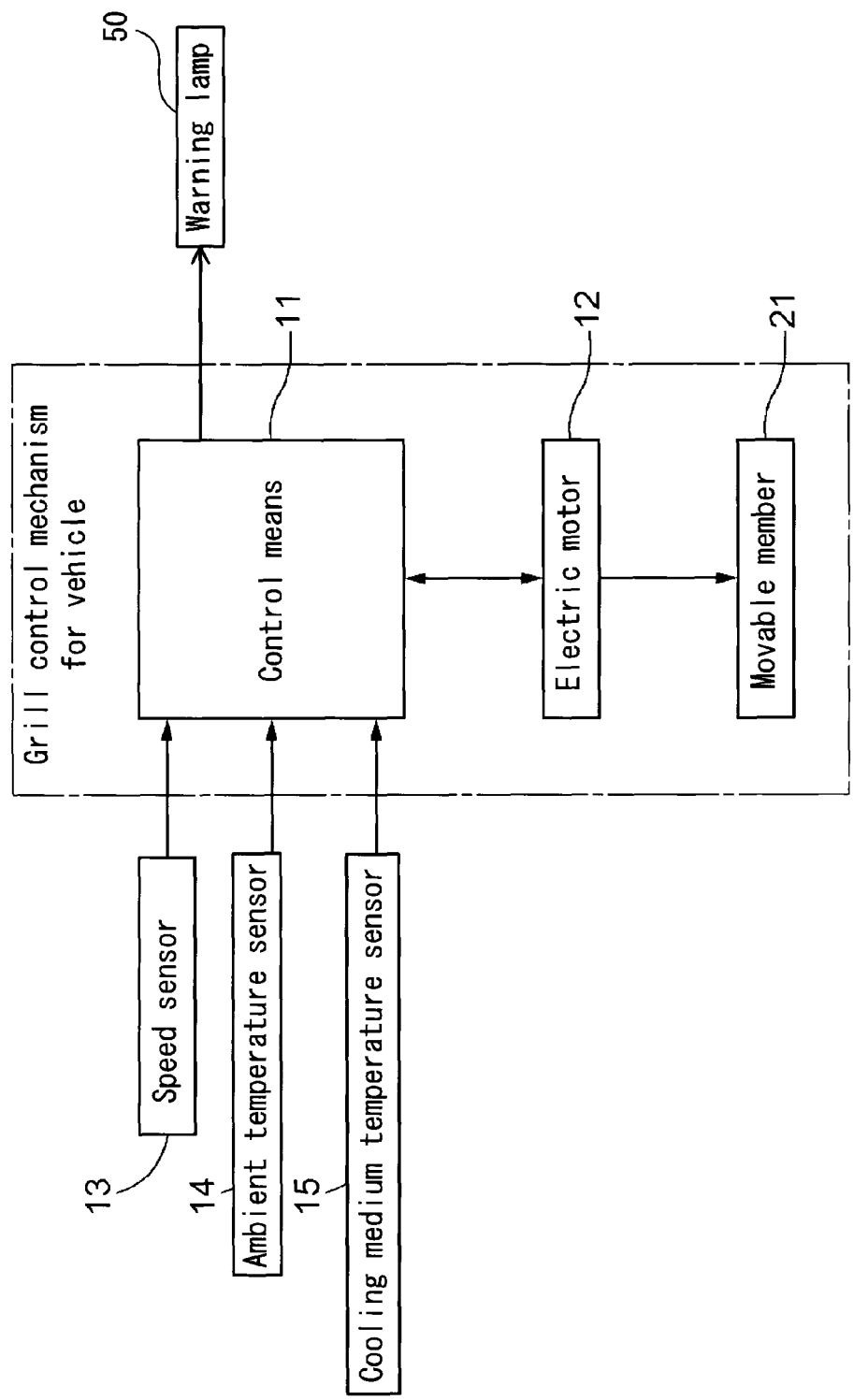
FIG. 3 is a diagram illustrating a configuration of a grille control mechanism for the vehicle according to an embodiment.

Illustrated in FIG. 3 is a configuration of the grille control mechanism for the vehicle. The control means 11 reads out detection values from a speed sensor 13, an ambient temperature sensor 14 and a cooling medium temperature sensor 15. Then, the control means 11 determines whether or not an opening operation condition for controlling the movable members 21 to be at the opened position is satisfied on the basis of the detection values and determines whether or not a closing operation condition for controlling the movable members 21 to be at the closed position is satisfied on the basis of the detection values. For example, in a case where a speed, which is detected by the speed sensor 13, is determined to be great, the control means 11 executes the closing operation (i.e. controlling the movable members 21 to be at the closed position) in order to ensure and enhance the driving stability of the vehicle. On the other hand, in a case where a cooling medium temperature, which is detected by the cooling medium temperature sensor 15, is determined to be high, the control means 11 executes the opening operation (i.e. controlling the movable members 21 to be at the opened position) in order to effectively cool down the cooling medium.

In this embodiment, the control means 11 executes the determination of the opening operation condition and the closing operation condition on the basis of the detection values from the speed sensor 13, the ambient temperature sensor 14 and the cooling medium temperature sensor 15. However, a determination factor for the opening operation condition and the closing operation condition is not limited to the above-mentioned detection values. For example, a detection value from other sensor may be used as a determination factor. An electric current is supplied to the electric motor 12 in the case where the control means 11 determines that the opening operation or the closing operation needs to be executed, accordingly, the movable members 21 are driven. Furthermore, the control means 11 monitors the electric current supplied to the electric motor 12, so that the control means 11 controls the electric current supplied to the electric motor 12 to be stopped in a case where the control means 11 detects a lock current value in order to stop the actuation of the movable members 21. The lock current value is detected when the movable members 21 reach a mechanical end portion, beyond which the movable members 21 are not movable.

An abnormality determination executed by the control means 11 will be descried below with reference to a flowchart illustrated in FIG. 4. The control means 11 appropriately reads out the detection values from the speed sensor 13, the ambient temperature sensor 14 and the cooling medium temperature sensor 15 while the vehicle is moving. Then, the control means 11 determines whether the opening operation condition for controlling the movable members 21 to be at the opened position or the closing operation condition for controlling the movable members 21 to be at the closed position is satisfied on the basis of the detection values (step S11). The control means 11 controls the electric current to be supplied to the electric motor 12 in response to the determination result and starts the opening operation or the closing operation (step S12).

A detailed explanation of steps following step S13 will be given on the basis of a case where the opening operation condition is satisfied in step S11 and the opening operation is started in step S12 in order to facilitate the explanation of the abnormality determination executed by the control means 11. The same is applied to a detailed explanation of a checking operation illustrated in a flowchart of FIG. 5. Additionally, the abnormality determination and the checking operation executed when the closing operation condition is satisfied in step S11 will be explained by replacing "opening" operation by the "closing" operation as indicated within brackets in FIGS. 4 and 5.

When the opening operation of the movable members 21 is started in response to the force supplied thereto from the electric motor 12 (step S12), the control means 11 monitors the current value applied to the electric motor 12 and checks whether or not the current value reaches the lock current value (step S13). In a case where the control means 11 does not detect the lock current value (No in step S13), the control means 11 controls the electric current to be continuously supplied to the electric motor 12 until the current value applied thereto reaches the lock current value. On the other hand, in a case where the control means 11 detects the lock current value (Yes in step S13), the control means 11 controls the electric current to be stopped being supplied to the electric motor 12 in order to stop the opening operation of the movable members 21 (step S14). Then, the control means 11 determines whether or not a time (a time duration) required for the lock current value to be detected exceeds a predetermined time (a predetermined time duration) (step S15).

In a case where the time for detecting the lock current value does not exceed the predetermined time (No in step S15), in other words, in a case where the control means 11 determines that a displacement of the movable members 21 to the opened position is completed without any problems, the control means 11 appropriately checks the operation condition and continues a normal opening/closing control (steps S11 to S15). On the other hand, in a case where the time for detecting the lock current value exceeds the predetermined time (Yes in step S15), it may be considered that some error, abnormality, a malfunction or the like occurs in a process of displacing the movable members 21 to the opened position and the movable members 21 stop moving before reaching the opened position. Hence, the control means 11 executes the checking operation for determining whether or not the operation state of the movable members 21 is in an abnormal state (step S16).

The checking operation executed by the control means 11 will be described in detail with reference to the flowchart illustrated in FIG. 5. In the case where the time for detecting the lock current value during the opening operation exceeds the predetermined time (Yes in step S15 in FIG. 4), the control means 11 reversely actuates the electric motor 12 (in order to reversely rotate the electric motor 12) in order to execute an operation of restoring the movable members 21 to an initial position, in other words, start the closing operation in this case (step S31). Hereinafter, the aforementioned closing operation is referred to as a "close-to-check operation". The control means 11 continuously executes the close-to-check operation until the control means 11 detects the lock current value. When the control means 11 detects the lock current value (Yes in step S32), the control means 11 stops the close-to-check operation (step S33) and reversely rotates the electric motor 12 in order to start the opening operation (step S34). Hereinafter, the aforementioned opening operation is referred to as an "open-to-check operation". The control means 11 continuously executes the open-to-check operation until the control means 11 detects the lock current value. Then, when the control means 11 detects the lock current value (Yes in step S35), the control means 11 stops the open-to-check operation (step S36) and the check operation is terminated.

Processes of the abnormality determination after the checking operation will be described below with reference to the flowchart illustrated in FIG. 4. After the checking operation is terminated, the control means 11 determines whether or not the time for detecting the lock current value in the open-to-check operation exceeds the predetermined time (step S17). Accordingly, because the abnormality of the operation state of the movable members 21 is determined on the basis only of the time (the time duration) for detecting the lock current value in the immediate open-to-check operation, instead of based on a time (a time duration) for detecting the lock current value in the close-to-check operation, the control means 11 does not need to memorize the time for detecting the lock current value. As a result, a control program may be simplified.

In a case where the time for detecting the lock current value in the open-to-check operation does not exceed the predetermined time (No in step S17), the control means 11 continuously executes the normal opening/closing operation while appropriately checking the operation condition (steps S11 to S15). On the other hand, in a case where the time for detecting the lock current value in the open-to-check operation exceeds the predetermined time (Yes in step S17), the control means 11 determines whether or not a number of times when the time for detecting the lock current value exceeds the predetermined time in a row reaches a predetermined number of times (step S18).

The predetermined number of times is preliminarily set. Any desired number of times including one (1, once) may be set as the predetermined number of times. However, in a case where a great number of times is set as the predetermined number of times, a number of times of the checking operation until the control means 11 determines the abnormal state may be increased, which may result in increasing power consumption. On the other hand, in a case where one (1, once) is set as the predetermined number of times, the control means 11 may determine that the movable members 21 are in the abnormal state before the object caught in the movable members 21 is completely removed. Therefore, the predetermined number of times may preferably set as two or approximately two.

In a case where the number of times when the time for detecting the lock current value in the open-to-check operation exceeds the predetermined time is less than the predetermined number of times (No in step S18), the control means 11 once again executes the checking operation (step S16). On the other hand, in a case where the number of times when the time for detecting the lock current value in the open-to-check operation exceeds the predetermined time in the row reaches the predetermined number of times (Yes in step S18), the control means 11 determines that the operation state of the movable members 21 are in the abnormal state (step S19). Additionally, the control means 11 may be modified so as to determine the abnormal state of the movable members 21 in a case where a total number of times when the time for detecting the lock current value in the open-to-check operation exceeds the predetermined time reaches the predetermined number of times, instead of determining the abnormal state of the movable members 21 in the case where the number of times when the time for detecting the lock current value in the open-to-check operation exceeds the predetermined time in the row reaches the predetermined number of times. Additionally, in the case where the control means 11 determines that the movable members 21 are in the abnormal state, the control means 11 activates a warning lamp 50, a warning buzzer or the like (i.e. a warning device) in order to inform an occupant that the abnormality occurs.

In the case where the control means 11 determines that the movable members 21 are in the abnormal state, the control means 11 checks whether or not the lock current value in the open-to-check operation is detected immediately after the operation is started (step S20). The detection of the lock current value immediately after the operation is started indicates that the lock current value is instantaneously detected when the electric current is supplied to the electric motor 12. In a case where the lock current value is detected immediately after the open-to-check operation is started (Yes in step S20), the control means 11 determines that the movable members 21 are not returned to the closed position by the close-to-check operation, in other words, the movable members 21 are in an immovable state where the movable members 21 are not bale to be moved to the opened position and to the closed position (step S21). In this case, the control means 11 stops the operation control in order to avoid an excessive load to be applied to the movable members 21, the electric motor 12 and the like, which occurs when the movable members 21 are controlled to be forcedly moved while the movable members 21 are in the immovable state (step S22).

On the other hand, in a case where the lock current value in the open-to-check operation is detected not immediately after the operation is started (No in step S20), the control means 11 determines that the movable members 21 are returned to the closed position by the close-to-check operation, in other words, the movable members 21 are in a partial range movable state where the movable members 21 are allowed to move in some distance between the opened position and the closed position (i.e. some of a distance between the opened position and the closed position) (step S23). In this case, the control means 11 executes the operation of restoring the movable members 21 to a position at which the movable members 21 are located when the operation is started, in other words, the control means 11 executes the opening operation and then stops the operation control in order to avoid a damage generated to the movable members 21 when the object is left being caught in the movable members 21 while the movable members 21 are in the abnormal state where the object is caught therein (step S24).

Figure 5:
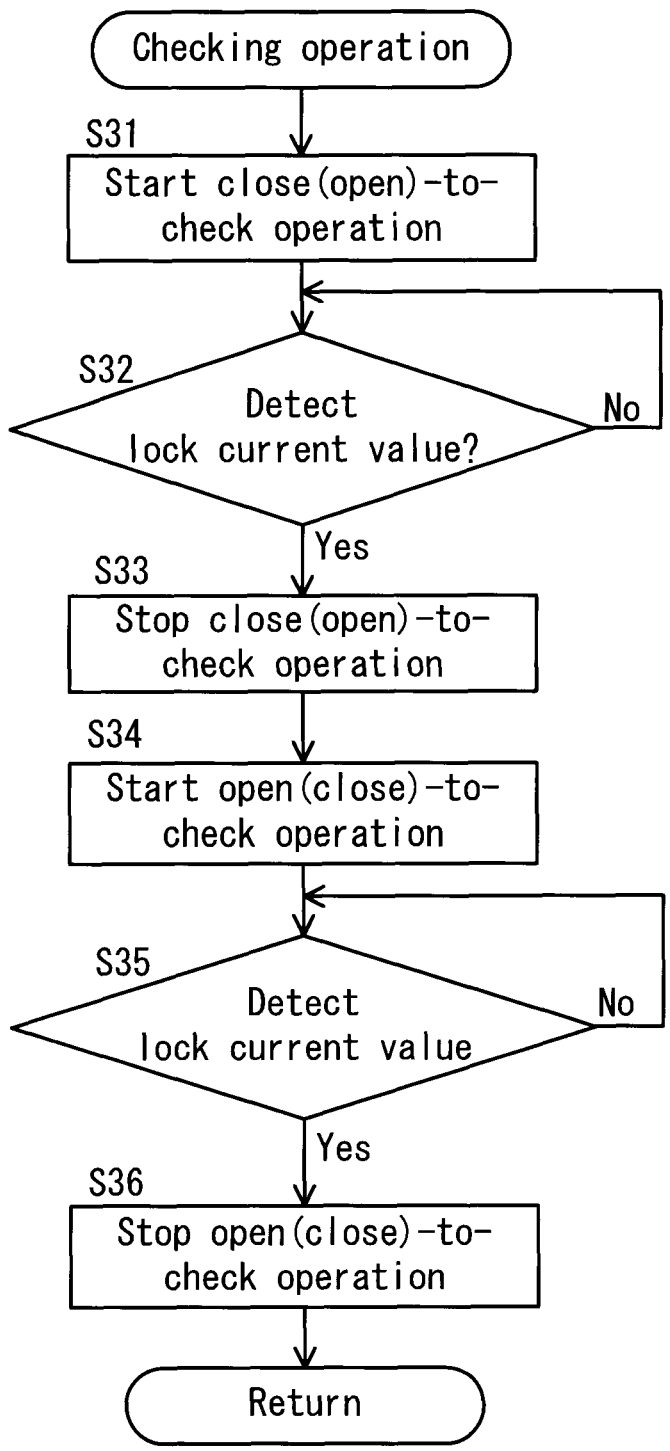
FIG. 5 is a flowchart illustrating processes of a checking operation.

In this embodiment, the control means 11 determines whether or not the lock current value is detected (step S20) immediately after the operation is started on the basis of the time for detecting the lock current value in the open-to-check operation (step S34, see FIG. 5). Accordingly, because the control means 11 does not need to memorize the time (the time duration) required for the lock current value to be detected in the close-to-check operation executed in step S31 (see FIG. 5), the control program may be simplified. Alternatively, a time (a time duration) for detecting the lock current value in the close-to-check operation may be used for determining whether or not the lock current value is detected immediately after the operation is started in step S20.

Other Embodiments

Figure 4:
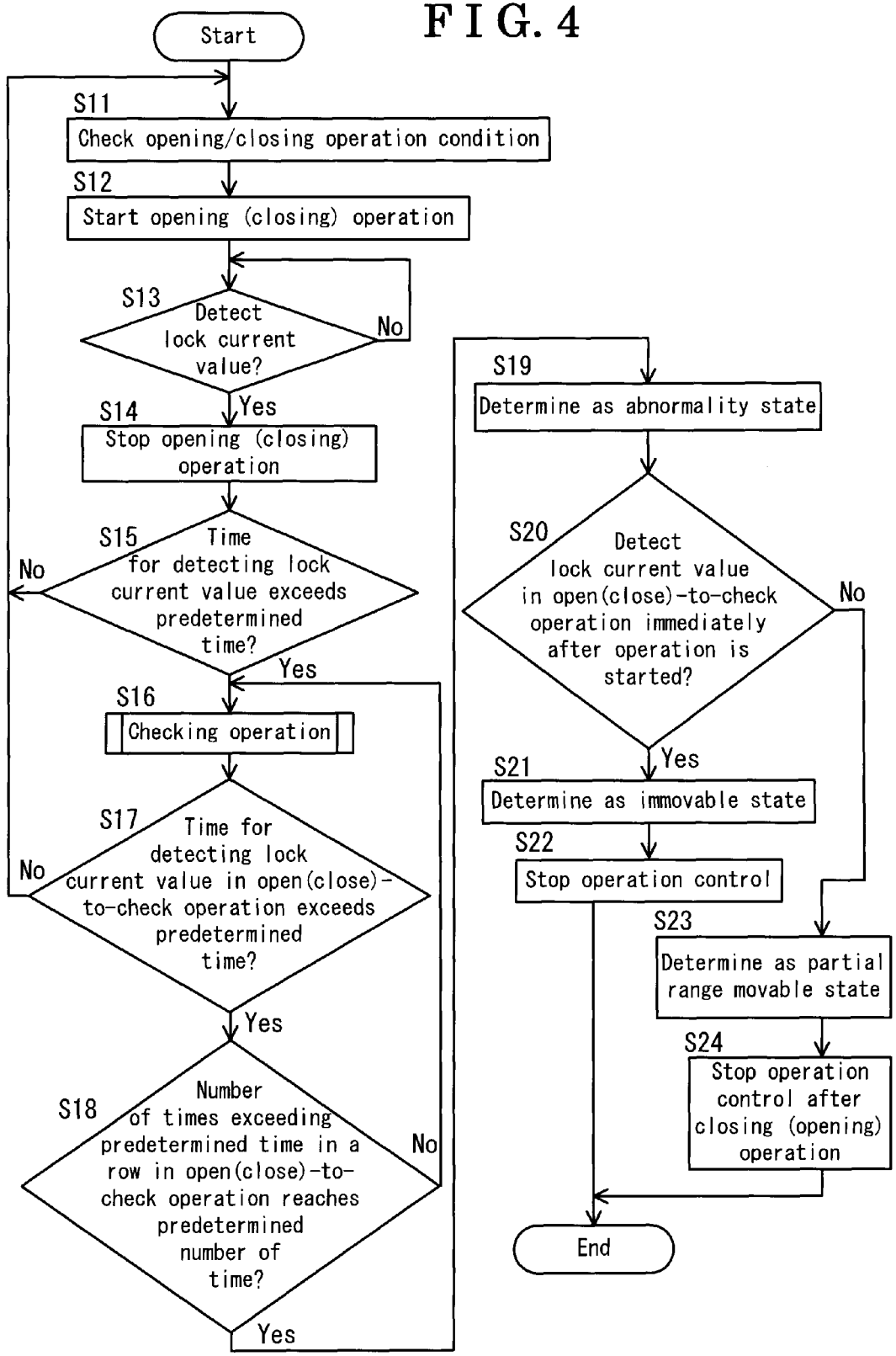
FIG. 4 is a flowchart illustrating an abnormality determination process.

In the above-described embodiment, it is assumed that the lock current value is detected in step S13 in FIG. 4. However, in a case where a connection (a fixation) between the movable members 21 and the corresponding rotating shafts 22 is loosened, the lock current value may not be detected no matter how much the electric motor 12 is actuated. Therefore, in view of the aforementioned case, the control means 11 may be modified so as to determine that the operation state of the movable members 21 is the abnormal state in a case where a predetermined time has elapsed without detecting the lock current value after the operation is started in step S12.

Furthermore, in the above-mentioned embodiment, each movable member 21 includes the main movable member 21a and the driven member 21b, as illustrated in FIGS. 1 and 2. For example, each of the movable members 21 does not need to include the main movable member 21a and the driven member 21b as different components, but all of the movable member 21 may be driven independently of each other. Furthermore, the rotating shaft 22 of the movable member 21 may be provided at other portion of the movable member 21 other than the end portion thereof.

Accordingly, the grille control mechanism for the vehicle for controlling the opening/closing operation of the movable members 21, which are configured so as to be switchable between the opened position for allowing the ambient air to flow into the radiator 3 and the closed position for inhibiting or restricting the ambient air from flowing into the radiator 3, may be achieved.

Accordingly, the control means 11 does not immediately determine that the movable members 21 are in the abnormal state in the case where the time (the time duration) for detecting the lock current value in the opening operation or the closing operation of the movable members 21 exceeds the predetermined time (the predetermined time duration). In this case, the control means 11 executes the checking operation for returning the movable members 21 to the initial position once and then executing once again the opening operation or the closing operation. Then, the control means 11 executes the abnormality determination on the basis of whether or not the time for detecting the lock current value in another opening operation or the closing operation exceeds the predetermined time. Accordingly, because the abnormality determination is executed on the basis of the time (time duration) for detecting the lock current value, an additional potentiometer and the like for detecting a position of the movable members 21 does not need to be provided at the grille control mechanism for the vehicle. As a result, the grille control mechanism for the vehicle having a flexibility in being mounted to various types of vehicle may be achieved while avoiding the increase in the manufacturing costs of the grille control mechanism.

Furthermore, because the abnormality determination is executed on the basis only of the time (the time duration) for detecting the most recent lock current value, the control means 11 does not need to memorize the time for detecting the past lock current value(s). As a result, the control program may be simplified. Still further, for example, in the case where the object is caught in the movable members 21 and the movable members 21 become immovable, but the movable members 21 are returnable to a normal state, where the object is removed, by restoring the movable members 21 to the initial position, the movable members 21 are once returned to the initial position by the check operation. Then, in the case where the abnormality is resolved in the checking operation, the operation control becomes continuable.

According to the embodiment, the predetermined number of times is set to two times.

In the case where one time is set as the predetermined number of times, the control means 11 may determine that the movable members 21 are in the abnormal state before the object caught in the movable members 21 is completely removed. On the other hand, in the case where a great number of times is set as the predetermined number of times, a number of times the checking operation is executed until the control means 11 determines the abnormal state may be increased, which may result in increasing the power consumption. Therefore, the predetermined number of times may preferably set to be two times or approximately two times. As a result, the object caught in the movable members 21 may be surely removed in the checking operation while reducing the power consumption.

According to the embodiment, the control means 11 determines that the movable members 21 are in the immovable state where the movable members 21 are not allowed to be moved to the opened position and the closed position in the case where the control means 11 determines that the movable members are in the abnormal state and the lock current value in the most recent checking operation is detected immediately after the one of the selectively executed opening operation and the closing operation is started. Furthermore, the control means 11 determines that the movable members are in the partial range movable state where the movable members are allowed to move for some of the range between the opened position and the closed position in the case where the control means 11 determines that the movable members are in the abnormal state and the lock current value in the most recent checking operation is not detected immediately after the one of the selectively executed opening operation and the closing operation is started.

Accordingly, the control means 11 may determine whether the movable members 21 are in the immovable state, where the movable members 21 are not movable at all or in the partial range movable state where the movable members 21 are allowed to move for some of range (distance) between the opened position and the closed position on the basis of the determination whether or not the lock current value in the opening operation or the closing operation in the most recent checking operation is detected immediately after the operation is started. Accordingly, because the control means 11 executes the abnormality determination on the basis only of the time for detecting the lock current value in the opening operation or the closing operation in the most recent checking operation, the control means 11 does not need to memorize the time for detecting the lock current value(s) in the previous checking operation(s). Therefore, the control program may be simplified. Additionally, the "most recent checking operation" includes the first (and the last) checking operation in a case where the checking operation is executed only once.

According to the embodiment, the control means 11 stops the one of the selectively executed opening operation and the closing operation of the movable members in the case where the movable members are in the immovable state and the control means 11 returns the movable members to the position where the movable members are located when the one of the selectively executed opening and closing operations is started and then, the control means 11 stops the one of the selectively executed opening operation and the closing operation in the case where the movable members are in the partial range movable state.

According to the embodiment, the grille control mechanism further includes a warning device for informing the occupant the abnormal state of the movable members.

According to the embodiment, the warning device includes the warning lamp 50.

According to the embodiment, the warning device includes the warning buzzer.

Accordingly, because the control means 11 stops the operation control in the case where the movable members 21 are in the immovable state, the excessive load may be avoided from being applied to the movable members 21, the electric motor 12 and the like, which occurs when the operation control is continued even if the movable members 21 are not able to move any further. Furthermore, in the case where the control means 11 determines that the movable members 21 are in the partial range movable state, the movable members 21 are returned to the initial position and then, the control means 11 stops the operation control. Therefore, in the case where, for example, the control means 11 determines that the movable members 21 are in the partial range movable state because the object is caught in the movable members 21, the damage may be avoided from being generated at the movable members 21, which may occur when the object is left being caught in the movable members 21.

The principles, preferred embodiment and mode of operation of this disclosure have been described in the foregoing specification. However, the disclosure which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the disclosure as defined in the claims, be embraced thereby.

The invention claimed is:

1. A grille control mechanism for a vehicle, comprising:
a movable members which is switchable between an opened position for allowing an ambient air to flow into a radiator provided at the vehicle and a closed position for inhibiting or restricting the ambient air from flowing into the radiator;
an electric motor which actuates the movable member; and
a control means which controls an electric current to be supplied to the electric motor by supplying the electric current to the electric motor until the control means detects a lock current value, in order to selectively execute one of an opening operation for moving the movable member to the opened position and a closing operation for moving the movable member to the closed position, wherein
when the control means determines that a time required for detecting the lock current value exceeds a predetermined time, the control means executes a checking operation, the checking operation including
returning the movable member to an initial position where the movable member is located when the one of the selectively executed opening and closing operations is started, and
executing once again one of the selectively executed opening operation and the closing operation, and
the control means determines an operation state of the movable member is an abnormal state when a time for detecting the lock current value after the one of the selectively executed opening and closing operation is started after the movable member is returned to the initial position in the checking operation exceeds the predetermined time for a predetermined number of times.

2. The grille control mechanism for the vehicle according to claim 1, wherein the predetermined number of times is set to two times.

3. The grille control mechanism for the vehicle according to claim 1, wherein the control means determines that the movable member is in an immovable state where the movable member is not allowed to be moved to the opened position and the closed position in a case where the control means determines that the movable member is in the abnormal state and the lock current value in the most recent checking operation is detected immediately after the one of the selectively executed opening operation and the closing operation is started, and wherein the control means determines that the movable member is in a partial range movable state where the movable member is allowed to move for some of range between the opened position and the closed position in a case where the control means determines that the movable member is in the abnormal state and the lock current value in the most recent checking operation is not detected immediately after the one of the selectively executed opening operation and the closing operation is started.

4. The grille control mechanism for the vehicle according to claim 3, wherein the control means stops the one of the selectively executed opening operation and the closing operation of the movable member in the case where the movable member is in the immovable state and the control means returns the movable member to the position where the movable member is located when the one of the selectively executed opening and closing operations is started and then, the control means stops the one of the selectively executed opening operation and the closing operation in the case where the movable member is in the partial range movable state.

5. The grille control mechanism for the vehicle according to claim 1, further comprising a warning device for informing an occupant the abnormal state of the movable member.

6. The grille control mechanism for the vehicle according to claim 5, wherein the warning device includes a warning lamp.

7. The grille control mechanism for the vehicle according to claim 5, wherein the warning device includes a warning buzzer.

8. The grille control mechanism for the vehicle according to claim 1, wherein in the checking operation, the executing once again one of the selectively executed opening operation and the closing operation is executed until the control means detects the lock current value.

9. A grille control mechanism for a vehicle, comprising:
a movable member which is switchable between an opened position for allowing an ambient air to flow into a radiator provided at the vehicle and a closed position for inhibiting or restricting the ambient air from flowing into the radiator;
an electric motor which actuates the movable member; and
a control means which controls an electric current to be supplied to the electric motor by supplying the electric current to the electric motor until the control means detects a lock current value, in order to selectively execute one of an opening operation for moving the movable member to the opened position and a closing operation for moving the movable member to the closed position, wherein
when the control means determines that a time required for detecting the lock current value is outside a range of a predetermined time, the control means executes a checking operation, the checking operation including
returning the movable member to an initial position where the movable member is located when the one of the selectively executed opening and closing operations is started, and
executing once again one of the selectively executed opening operation and the closing operation, and
the control means determines an operation state of the movable member is an abnormal state when a time for detecting the lock current value after the one of the selectively executed opening and closing operation is started after the movable member is returned to the initial position in the checking operation is outside a range of the predetermined time for a predetermined number of times.

* * * * *